(12) United States Patent
Otsuka et al.

(10) Patent No.: US 7,764,486 B2
(45) Date of Patent: Jul. 27, 2010

(54) GAS-INSULATED POWER APPARATUS

(75) Inventors: Takuya Otsuka, Tokyo (JP); Hitoshi Sadakuni, Tokyo (JP); Daisuke Fujita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/091,966

(22) PCT Filed: Mar. 31, 2006

(86) PCT No.: PCT/JP2006/306881

§ 371 (c)(1), (2), (4) Date: Apr. 29, 2008

(87) PCT Pub. No.: WO2007/116479

PCT Pub. Date: Oct. 18, 2007

(65) Prior Publication Data

US 2009/0154069 A1    Jun. 18, 2009

(51) Int. Cl.
*H02B 13/02* (2006.01)

(52) U.S. Cl. .................. 361/612; 361/604; 361/605; 361/618; 361/619; 361/622; 361/631; 218/43; 218/45; 218/69; 218/73; 218/75; 218/80; 218/84

(58) Field of Classification Search .......... 361/602–621, 361/624–634, 673, 829, 807–810, 830, 832; 218/2, 7, 10–14, 43–47, 67–71, 80–84, 152–158; 307/142, 147, 149; 200/48 A, 48 B
See application file for complete search history.

(56) References Cited

U.S. PATENT DOCUMENTS

| | | | | |
|---|---|---|---|---|
| 4,638,403 A | * | 1/1987 | Amano et al. | 361/612 |
| 4,744,002 A | * | 5/1988 | Nakano et al. | 361/612 |
| 4,752,860 A | * | 6/1988 | Romanet et al. | 361/602 |

(Continued)

FOREIGN PATENT DOCUMENTS

JP    54-069737 A    6/1979

(Continued)

*Primary Examiner*—Michael V Datskovskiy
(74) *Attorney, Agent, or Firm*—Buchanan Ingersoll & Rooney PC

(57) ABSTRACT

A gas-insulated power apparatus comprising a vertically arranged gas-insulated circuit breaker included in a vertically arranged gas-insulated main tank, a first gas-insulated branch pipe connected to one side of an upper portion of the gas-insulated main tank substantially orthogonal to a direction of extending the gas-insulated main tank and leading out a feeder from a movable side of the gas-insulated circuit breaker, and a second and a third gas-insulated branch pipes which are respectively connected to both sides in a peripheral direction of a lower portion of the gas-insulated main tank substantially orthogonal to the direction of extending the gas-insulated main tank, one of which connects a fixed side of the gas-insulated circuit breaker to one gas-insulated Y bus of gas-insulated double buses and other of which connects the fixed side of the gas-insulated circuit breaker to other gas-insulated X bus of the gas-insulated double buses, respectively, by which a gas-insulated power apparatus having a structure in which although a width thereof is more or less widened, a height thereof is hardly changed and which is stable can be realized.

18 Claims, 13 Drawing Sheets

U.S. PATENT DOCUMENTS

| | | | | |
|---|---|---|---|---|
| 4,821,141 | A * | 4/1989 | Torimi et al. | 361/612 |
| 4,867,890 | A * | 9/1989 | Colclough et al. | 508/192 |
| 4,890,193 | A * | 12/1989 | Tsubaki | 361/612 |
| 4,967,307 | A * | 10/1990 | Itou et al. | 361/618 |
| 5,001,599 | A * | 3/1991 | Itou et al. | 361/604 |
| 5,134,542 | A * | 7/1992 | Suzuyama et al. | 361/618 |
| 5,177,664 | A * | 1/1993 | Tsuchiya et al. | 361/612 |
| 5,558,524 | A * | 9/1996 | Classon et al. | 439/92 |
| 5,578,805 | A * | 11/1996 | Berger et al. | 218/43 |
| 5,589,674 | A * | 12/1996 | Berger et al. | 218/71 |
| 5,625,179 | A * | 4/1997 | Bleiker et al. | 218/80 |
| 5,627,723 | A * | 5/1997 | Hageli et al. | 361/602 |
| 5,898,565 | A * | 4/1999 | Yamauchi et al. | 361/612 |
| 6,219,225 | B1 * | 4/2001 | Tsuzura et al. | 361/612 |
| 6,399,911 | B1 * | 6/2002 | Tsuzura et al. | 218/43 |
| 6,407,908 | B1 * | 6/2002 | Iryo et al. | 361/604 |
| 6,515,247 | B1 * | 2/2003 | Tsuzura et al. | 218/43 |
| 6,556,428 | B1 * | 4/2003 | Takahoshi et al. | 361/619 |
| 6,946,613 | B2 * | 9/2005 | Otsuka et al. | 218/79 |
| 7,236,351 | B2 * | 6/2007 | Chavot et al. | 361/604 |
| 7,391,605 | B2 * | 6/2008 | Sologuren-Sanchez et al. | 361/612 |

FOREIGN PATENT DOCUMENTS

| | | | | |
|---|---|---|---|---|
| JP | 58-165613 | | | 9/1983 |
| JP | 59-198810 | | | 11/1984 |
| JP | 60-002006 | | | 1/1985 |
| JP | 60-059909 | A | | 4/1985 |
| JP | 61-072007 | U | | 5/1986 |
| JP | 61-191209 | | | 8/1986 |
| JP | 62-044608 | U | | 3/1987 |
| JP | 62-110410 | A | | 5/1987 |
| JP | 01286707 | A | * | 11/1989 |
| JP | 02-079109 | U | | 6/1990 |
| JP | 404049802 | A | * | 6/1990 |
| JP | 04-049802 | | | 2/1992 |
| JP | 04-054132 | U | | 5/1992 |
| JP | 406209505 | A | * | 1/1993 |
| JP | 05091610 | A | * | 4/1993 |
| JP | 06-031313 | U | | 4/1994 |
| JP | 06-105425 | | | 4/1994 |
| JP | 06-036311 | U | | 5/1994 |
| JP | 408065841 | A | * | 3/1996 |
| JP | 08-214426 | | | 8/1996 |
| JP | 11-089028 | A | | 3/1999 |
| JP | 2000050439 | A | * | 2/2000 |
| JP | 2000-236604 | A | | 8/2000 |
| JP | 02001118472 | A | * | 4/2001 |
| JP | 2001-286016 | | | 10/2001 |
| JP | 02001339820 | A | * | 12/2001 |
| JP | 2005057944 | A | * | 3/2005 |

* cited by examiner

Prior Art

Prior Art

GAS-INSULATED POWER APPARATUS

TECHNICAL FIELD

The present invention relates to a gas-insulated power apparatus for connecting a gas-insulated bus and a feeder by way of a gas-insulated circuit breaker.

BACKGROUND ART

According to a feeding system of a double bus type, for example, as shown by FIG. 21, double busses X, Y are connected to a circuit breaker CB by way of bus side disconnecting switches DS1, DS2. The bus side disconnecting switches DS1, DS2 on a side of the circuit breaker CB as well as the circuit breaker CB on a side of the circuit breakers DS1, DS2 are connected to a grounding switch ES1. A current transformer CT1, a disconnecting switch DS3, a voltage transformer VT, a grounding switch ES2 and a line side grounding switch FES are connected between a cable head CHD constituting a connection end of a feeder cable and the circuit breaker CB. As shown by FIG. 22, the respective apparatus are insulated by a gas and connected to each other to constitute a gas insulated power apparatus integrated thereby.

In a background art, as shown by FIG. 22, the gas-insulated power apparatus is physically arranged with a gas-insulated main tank GIMT, a first gas-insulated branch pipe GTBT1, a second gas-insulated branch pipe GIBT2, a third gas-insulated branch pipe GIBT3, the double buses X, Y, the bus side disconnecting switches DS1, DS2, the circuit breaker CB, the grounding switch ES1, the cable head CHD, the current transformer CT1, the disconnecting switch DS3, the voltage transformer VT, the grounding switch ES2, and the line side grounding switch EFS and the like.

The second gas-insulated branch pipe GIBT2 connected with the Y bus is arranged right below the first gas-insulated branch pipe GIBT1 on the feeder side, and the third gas-insulated branch pipe GIBT3 connected with the X bus is arranged right below the second gas-insulated branch pipe GIBT2.

A case of a constitution shown in FIG. 22 poses a problem mentioned later, and therefore, there is a case of needing a constitution of FIG. 23. In FIG. 23, the third gas-insulated branch pipe GIBT3 is arranged on an opposed side of the first gas-insulated branch pipe GIBT1, and the second gas-insulated branch pipe GIBT2 having a length in an axial direction longer than the third gas-insulated branch pipe GIBT3 is arranged right below the third gas-insulated branch pipe GIBT3.

Further, the second and the third gas-insulated branch pipes GIBT2, GIBT3 are provided with peeping holes PWX, PWY in correspondence with respectives of the double busses X, Y, the bus side disconnecting switch DS1, DS2, the grounding switch ES1, and a length W2 of the second gas-insulated branch pipe GIBT2 having the longer length in the axial direction is set such that insides thereof can optically be recognized from the respective view ports PWX, PWY, particularly, the view port PWY on the second gas-insulated branch pipe GIBT2 does not overlap the third gas-insulated branch pipe GIBT3 in a vertical direction. Further, as a gas-insulated power apparatus having a structure in which there are not view ports PWX, PWY and the lengths in the axial direction of the second and the third gas-insulated branch pipes GIBT2, GIBT3 are substantially the same, there is JP-A-11-89028 (Patent Reference 1).

Further, as shown by FIG. 24, there is a case in which bus side current transformers CT21, CT22 are provided between the circuit breaker CB and the bus side disconnecting switches DS1, DS2 corresponding to the bus side disconnecting switches DS1, DS2 respectively, a physical arrangement thereof is as shown by FIG. 25, and the bus side transformers CT21, CT22 are arranged in the second and the third gas-insulated branch pipes CIBT2, GIBT3.

Patent Reference 1: JP-A-11-89028 (FIG. 1 and its explanation)

DISCLOSURE OF THE INVENTION

Problems that the Invention is to Solve

Although in the background art apparatus shown in FIG. 21 and FIG. 22, depending on a user, installation of view ports (both of which are illustrated by one-dotted chain lines in FIG. 22) is requested, since intervals in an up and down direction among the first through the third respective gas-insulated branch pipes GIBT1, GIBT2, GIBT3 are short, even when the view ports PWX, PWY are assumedly provided, it is substantially difficult to confirm inside thereof optically from the view ports PWX, PWY.

Hence, when the intervals among the first through the third gas-insulated branch pipes GIBT1, GIBT2, GIBT3 in the up and down direction are prolonged such that the optical confirmation can be carried out, a height of the third gas-insulated branch pipe GIBT3 is heightened, a height of the first gas-insulated branch pipe GIBT1 is further heightened, and therefore, a height of an operating apparatus HSG of the breaker CB is heightened from H1 to H2 as shown by the one-dotted chain lines.

When the height of the operating apparatus HSG of the circuit breaker CB is heightened from H1 to H2 as shown by the one-dotted chain line, there are a number of cases in which the height H2 exceeds a height restriction of a general road, for example, 3.6 mm, in that case, the apparatus cannot be transported on a general road.

Therefore, as shown by FIG. 23, the second and the third gas-insulated branch pipes GIBT2, GIBT3 are provided with the view ports PWX, PWY in correspondence with respectives of the double buses X, Y, the bus side disconnecting switches DS1, DS2, the grounding switch ES1, and the length W2 of the second gas-insulated pipe GIBT2 having the longer length in the axial direction such that the insides can optically be recognized from the respective view ports PWX, PWY, particularly, the view port PWY on the second gas-insulated branch pipe GIBT2 does not overlap the third gas-insulated branch pipe GIBT3 in the vertical direction.

In a case of the structure shown in FIG. 23, although the insides can firmly be recognized optically from the respective view ports PWX, PWY, as the gas-insulated power apparatus, in comparison with the gas-insulated power apparatus shown in FIG. 22, a width thereof is widened by illustrated W2. Further, both of the second and the third gas-insulated branch pipes GIBT2, GIBT3 are arranged on the side opposed to the first gas-insulated branch pipe GIBT1, the length of the second gas-insulated branch pipe GIBT2 is as long as W2, and therefore, the gas-insulated main tank GIMT is applied with an uneven load to constitute an unstable structure.

Further, in the background apparatus shown in FIG. 24, FIG. 25, there are needed 2 pieces of the bus side current transformers CT21, CT22, further, a length in an axial direction of either of the second and the third gas-insulated branch pipes GIBT2, GIBT3 is as long as W3 which is longer than a length W1 when there are not the bus side current transformers CT21, CT22, an even load applied to the gas-insulated main tank GIMT becomes larger than that in the case of FIG. 23 to constitute a further unstable structure.

Hence, although it is conceivable to arrange one piece of a current transformer common to the both buses XY at a common region CA surrounded by an ellipse of a one-dotted chain line in FIG. 24, in that case, as shown by a one-dotted chain line in FIG. 25, the circuit breaker CB, and the operating apparatus HSG are arranged on an upper side, and the common one piece current transformer is arranged therebelow, and therefore, when the height of the operating apparatus HSG is heightened from H1 to H3 as shown by one-dotted chain lines, there are a number of cases in which the height H3 exceeds a height restriction of a general road, for example, 3.6 mm, and in that case, the apparatus cannot be transmitted on a general road.

The invention has been carried out in view of the above-described actual situation and it is an object thereof to realize a gas-insulated power apparatus having a structure in which although a width thereof is more or less widened, a height thereof is hardly changed and is stable.

MEANS FOR SOLVING THE PROBLEMS

A gas-insulated power apparatus according to the invention includes a vertically arranged gas-insulated circuit breaker included in a vertically arranged gas-insulated main tank, a first gas-insulated branch pipe connected to one side of an upper portion of the gas-insulated main tank substantially orthogonal to a direction of extending the gas-insulated main tank and leading out a feeder from a movable side of the gas-insulated circuit breaker, and a second and a third gas-insulated branch pipe which are respectively connected to both sides in a peripheral direction of a lower portion of the gas-insulated main tank substantially orthogonal to the direction of extending the gas-insulated main tank, one of which connects a fixed side of the gas-insulated circuit breaker to one gas-insulated Y bus of gas-insulated double buses and other of which connects the fixed side of the gas-insulated circuit breaker to other gas-insulated X bus of the gas-insulated double buses, respectively, by which a gas-insulated power apparatus having a structure in which although a width thereof is more or less widened, a height thereof is hardly changed and which is stable is realized.

ADVANTAGE OF THE INVENTION

According to the invention, the gas-insulated power apparatus includes the vertically arranged gas-insulated circuit breaker included in the vertically arranged gas-insulated main tank, the first gas-insulated branch pipe connected to the one side of the upper portion of the gas-insulated main tank substantially orthogonal to the direction of extending the gas-insulated main tank and leading out the feeder from the movable side of the gas-insulated circuit breaker, and the second and the second and the third gas-insulated branch pipes which are connected to the both sides in the peripheral direction of the lower portion of the gas-insulated main tank substantially orthogonal to the direction of extending the gas-insulated main tank, one of which connects the fixed side of the gas-insulated circuit breaker to the one gas-insulated Y bus of the gas-insulated double buses and other of which connects the fixed side of the gas-insulated circuit breaker to the other gas-insulated X bus of the gas-insulated double buses, respectively, by which the gas-insulated power apparatus having the structure in which although the width is more or less widened, the height is hardly changed and which is stable can be realized.

BEST MODE FOR CARRYING OUT THE INVENTION

Embodiment 1

Embodiment 1 of the invention will be explained in reference to FIG. 1 through FIG. 4 as follows. FIG. 1 is a system diagram showing an example of a feeding system of a double bus type, FIG. 2 is a side view showing a portion of an example of a gas-insulated power apparatus in correspondence with the system diagram of FIG. 1 by a section, FIG. 3 is a plane view of the gas-insulated power apparatus shown in FIG. 2, FIG. 4 is a plane view showing a case of a switch DS/ES of a rotary type having a function of a disconnecting switch and a function of a grounding switch. Further, in FIG. 1 through FIG. 5, the same portions are attached with the same notations.

As shown by FIG. 1, an example of the feeding system of the double bus type in Embodiment 1 of the invention is the same as that in FIG. 21 mentioned above, a double buses X, Y are connected to a circuit breaker CB by way of a bus side disconnecting switch DS1, DS2. The bus side disconnecting switches DS1, DS2 on the side of the circuit breaker CB and the circuit breaker CB on the side of the disconnecting switches DS1, DS2 are connected to the grounding switch ES1. A current transformer CT1, a disconnecting switch DS3, a voltage transformer VT, a grounding switch ES2 and a line side grounding switch EFS are connected between a cable head CHD constituting the connection end of a feeder cable, and the circuit breaker CB. As shown by FIG. 2, the respective apparatus are insulated by a gas and connected to each other to constitute a gas-insulated power apparatus integrated thereby. A constitution of the gas-insulated power apparatus shown in FIG. 2 essentially differs from FIGS. 22, 23, 25 showing the constitutions of the background art apparatus mentioned above.

That is, the constitution of Embodiment 1 is a constitution physically arranged with the gas-insulated main tank GIMT, the first gas-insulated branch pipe GIBT1, the second gas-insulated branch pipe GIBT3, the third gas-insulated branch pipe GIBT3, the double buses X, Y, the bus side disconnecting switches DS1, DS2, the circuit breaker CB, the grounding switch ES1, the cable head CHD, the current transformer CT1, the disconnecting switch DS3, the voltage transformer VT, the grounding switch ES2, and the line side grounding switch EFS, and the like as shown by FIG. 2.

Particularly, there is constructed a constitution including the vertically arranged gas-insulated circuit breaker CB included in the vertically arranged gas-insulated main tank GIMT, the first gas-insulated branch pipe GIBT1 connected to one side of an upper portion of the gas-insulated main tank GIMT substantially orthogonal to a direction of extending the gas-insulated main tank GIMT by way of a flange ELF, including the current transformer CT1 and leading out the feeder from a movable side of the gas-insulated circuit breaker CB, and the second and the third gas-insulated branch pipes GIBT2, GIBT3 respectively connected to both sides in a peripheral direction of a lower portion of the gas-insulated main tank GIMT substantially orthogonally to a direction of extending the gas-insulated main tank GIMT by way of flanges FLX, FLY, one side thereof connecting a fixed side of the gas-insulated circuit breaker CB to one gas-insulated Y bus of the gas-insulated double buses, other side thereof connecting the fixed side of the gas-insulated circuit breaker CB to other gas-insulated X bus of the gas-insulated double buses, respectively, and therefore, the second and the third gas-insulated branch pipes GIBT2, GIBT3 as well as the bus lines X, Y are disposed on both sides in the peripheral direction of the lower portion of the gas-insulated main tank GIMT, and therefore, earthquake-proof is promoted, a space of installing the bus side current transformer can be ensured without heightening the height of the gas-insulated main tank GIMT, also the view ports can be installed to exhibit inherent functions without prolonging the length in the axial direction of the second or the third gas-insulated branch pipes GIBT2, GIBT3, and an operational space of maintenance, check and the like can be ensured between the first gas-insulated branch pipe GIBT1 and the second and the third gas-insulated branch pipes GIBT2, GIBT3.

Further, the second and the third gas-insulated branch pipes GIBT2, GIBT3 are coaxially arranged, the second gas-insulated branch pipe GIBT2 is arranged right below the first gas-insulated branch pipe GIBT1 to be in parallel with the first gas-insulated branch pipe GIBT1, further, the first gas-insulated branch pipe GIBT1 and the second and the third gas-insulated branch pipes GIBT2, GIBT3 are arranged orthogonally to the gas-insulated main tank GIMT.

Further, as exemplified in FIG. 3, the gas-insulated Y bus of one of the gas-insulated double buses is orthogonally intersected with the second gas-insulated branch pipe GIBT2, and the gas-insulated X bus of other of the gas-insulated double buses is orthogonally intersected with the third gas-insulated branch pipe GIBT3.

Both of the gas-insulated Y bus of one of the gas-insulated double buses and the gas-insulated X bus of other thereof are constituted by the gas-insulated bus summarized with 3 phases as illustrated. Further, the gas-insulated buses X, Y may be constituted by phase separated gas-insulated buses separated for respective phases. However, when a phase separated gas-insulated bus type is constituted, a structure including apparatus connected or communicated with the buses becomes complicated, and therefore, for example, even when the phase separated gas-insulated bus type is adopted in a high voltage system exceeding 60 KV by 1 rank, for example, in a system of 60 KV level or equal to or lower than 60 KV, the 3 phase summarized gas-insulated bus type which does not complicate a structure is preferable.

Further, the bus side disconnecting switch DS2 and the bus side disconnecting switch/installed switch DS1/ES1 are included at a portion of intersecting the gas-insulated Y bus and the second gas-insulated branch pipe GIBT2 and a portion of intersecting the gas-insulated X bus and the third gas-insulated branch pipe GIBT3, and operating apparatus DSOM2, DSOM1 of the disconnecting switches are provided on a lower side of the portion of intersecting the gas-insulated Y bus and the second gas-insulated branch pipe GIBT2 and a lower side of the portion of intersecting the gas-insulated X bus and the third gas-insulated branch pipe GIBT3.

Further, although the bus side disconnecting switch/installed switch DS1/ES1 is well known, as exemplified in FIG. 4, by being operated by an operating apparatus, DS1/ES1 is pivoted from a disconnecting switch closed position DS to a disconnecting switch open position N, when operated to be pivoted further, reaches a ground position ES connected to a ground terminal connected to a tank or a pipe at ground potential, and when operated in an inverse direction, successively reaches respective positions of ES→E→DS.

Further, there are provided a 3 phase linear first connection conductor 3ΦCD1 arranged at inside of the gas-insulated main tank GIMT for connecting the gas-insulated Y bus of one of the gas-insulated buses and the gas-insulated X bus of other of the gas-insulated double buses, and a 3 phase linear second connection conductor 3ΦCD2 arranged at inside of the gas-insulated main tank GIMT, an upper end thereof being connected to the gas-insulated circuit breaker CB and a lower end thereof being connected to the first connection conductor 3ΦCD1, respectively. Therefore, a conductor which is folded to bend for connection is dispensed with, further, also a bus side current transformer (CT2 mentioned later) which is arbitrarily needed can easily be installed.

The second connection conductor 3ΦCD2 is connected to the first connection conductor 3ΦCD1 by well-known tulip contact orthogonally to the first connection conductor 3ΦCD1 as illustrated.

Further, as illustrated, the gas-insulated circuit breaker CB and the feeder side of the gas-insulated circuit breaker CB are constituted by a 3 phase summarized gas-insulated apparatus. Further, the gas-insulated circuit breaker CB and the feeder side of the gas-insulated circuit breaker CB may be constituted by an apparatus separated for respective phases, that is, a phase separated gas-insulated apparatus. However, when constituted by a phase separating type separated for respective phases, the structure becomes complicated, and therefore, even when the type is adopted in a high voltage system exceeding 60 KV by one rank, for example, in a system of 60 KV level or equal to or lower than 60 KV, as in Embodiment 1, the 3 phase summarized type which does not complicate the structure is preferable.

Further, as illustrated, the first gas-insulated branch pipe GIBT1 for extracting the feeder from the movable side of the gas-insulated circuit breaker CB includes a bellows GIBT1BL in series therewith. The bellows GIBT1BL can be elongated and contacted in view of a structure thereof, and therefore, the first gas-insulated branch pipe GIBT1 can be integrated to between the tank on a side of the cable hand CHD constituting the connection end of the feeder cable FC and the gas-insulated main tank GIMT, and the first gas-insulated branch pipe GIBT1 can be detached from between the tank on the side of the cable head CHD and the gas-insulated main tank GIMT in an accident or check, easily.

Further, as illustrated, the circuit breaker operating apparatus HSG of the gas-insulated circuit breaker CB is disposed at an outer side of the gas-insulated main tank GIMT and is attached to an upper portion of the gas-insulated main tank GIMT, and an arc extinguishing chamber AEC of the vertically arranged gas-insulated circuit breaker CB is disposed on a side of the lower portion of the gas-insulated circuit breaker CB.

Further, as illustrated, a particle trap PTCLTP is provide at a side wall of the gas-insulated main tank GIMT in correspondence with a lower end portion of the arc extinguishing chamber AEC. Although the particle trap PTCLTP per se is well known, according to Embodiment 1, when the gas-insulated circuit breaker CB is operated to shut off, a metal vapor evaporated from a contact thereof by the arc is scattered by a small amount from a lower end portion of the arc extinguishing chamber AEC, and therefore, the particle trap PTCLTP provided at the side wall of the gas-insulated main tank GIMT in correspondence with the lower end portion of the arc extinguishing chamber AEC catches the scattered and floated metal vapor.

Embodiment 2

Embodiment 2 of the invention will be explained in reference to FIG. 5 and FIG. 6 as follows. FIG. 5 is a system diagram showing other example of a feeding system of a double bus type, FIG. 6 is a side view showing a portion of an example of a gas-insulated power apparatus in correspondence with the system diagram of FIG. 5 by a section. Further, in FIG. 5 and FIG. 6, portions the same as or corresponding to those of FIG. 1 through FIG. 4 are attached with the same notations, in explaining of Embodiment 2 as follows, a point different from FIG. 1 through FIG. 4 will mainly be explained and an explanation of the other will be spared.

As exemplified in FIG. 5, Embodiment 2 differs from Embodiment 1 in that a bus side current transformer CT2 commonly used for the buses X, Y is provided on a side of the buses X, Y of the circuit breaker CB.

As exemplified in FIG. 6, a physical arrangement of the bus side current transformer CT2 is provided at a surrounding of the second connection conductor 3ΦCD2 to be disposed between the first connection conductor 3ΦCD1 and the arc extinguishing chamber AEC of the gas-insulated circuit breaker CB for detecting a current of the second connection conductor 3ΦCD2.

The second and the third gas-insulated branch pipes GIBT2, GIBT3 and the buses X, Y are disposed on the both sides in the peripheral direction of the lower portion of the gas-insulated main tank GIMT, and therefore, even when the bus side current transformer CT2 is installed between the first connection conductor 3ΦCD1 and the arc extinguishing chamber AEC of the gas-insulated circuit breaker CB, the height of the gas-insulated main tank GIMT needs not to be heightened but can be maintained at the height within the height restriction of the general road, further, it is not necessary to provide 2 pieces of the bus side current transformers CT21, CT22 as in the background art apparatus shown in FIG. 25, further, it is not necessary to prolong the second and the third gas-insulated branch pipes GIBT2, GIBT3 by the amount of the length of the bus side current transformer as in the background art apparatus shown in FIG. 25.

Embodiment 3

Embodiment 3 of the invention will be explained in reference to FIG. 7 and FIG. 8 as follows. FIG. 7 is a system diagram showing other example of a feeding system of a double bus type, and FIG. 8 is a side view showing an example of a gas-insulated power apparatus in correspondence with the system diagram of FIG. 7 by constituting a portion thereof by a section. Further, in FIG. 7 and FIG. 8, portions the same as or corresponding to those of FIG. 1 through FIG. 6 are attached with the same notations and in explaining Embodiment 3 as follows, a point different from FIG. 1 through FIG. 6 will mainly be explained and an explanation of the other will be spared.

As exemplified in FIG. 8, Embodiment 3 differs from Embodiment 1 in that the view ports PWX, PWY are provided on an upper side of a portion of intersecting the gas-insulated Y bus and the second gas-insulated branch pipe GIBT2 and an upper side of a portion of intersecting the gas-insulated X bus and the third gas-insulated branch pipe GIBT3.

The view port PWX is disposed right above the operating apparatus DSOM1 disposed at the lower portion of the third gas-insulated branch pipe GIBT3, and the view port PWY is disposed right above the operating apparatus DSOM2 disposed at the lower portion of the second gas-insulated branch pipe GIBT2.

The upper side of the view port PWX is not hindered, and therefore, the inside can optically be viewed easily from the view port PWX, although the first gas-insulated branch pipe GIBT1 is disposed on the upper side of the view port PWY, a sufficient space is formed between the first gas-insulated branch pipe GIBT1 and the view port PWY, and therefore, the inside can optically be viewed easily from the view port PWY. Further, the view ports PWX, PWY and the operating apparatus DSOM1, DSOM2 may be arranged on the same side, for example, both thereof may be arranged on the upper sides of the second and the third gas-insulated branch pipes GIBT2, GIBT3.

Embodiment 4

Embodiment 4 of the invention will be explained in reference to FIG. 9 and FIG. 10 as follows. FIG. 9 is a system diagram showing other example of a feeding system of a double bus type, FIG. 10 is a side view showing an example of a gas-insulated power apparatus in correspondence with the system diagram of FIG. 9 by constituting a portion thereof by a section. Further, in FIG. 9 and FIG. 10, portions the same as or corresponding to those of FIG. 1 through FIG. 8 are attached with the same notations, and in explaining of Embodiment 4 as follows, a point different from FIG. 1 through FIG. 8 will mainly be explained, and an explanation of the other will be spared.

As exemplified in FIG. 10, Embodiment 4 is a case including the bus side current transformer CT2 commonly used for the buses X, Y constituting a characteristic point of Embodiment 2 (exemplified by FIG. 5 and FIG. 6) similar to Embodiment 2, further, including the view port PWX, PWY constituting a characteristic point of Embodiment 4 (exemplified by FIG. 7 and FIG. 8) similar to Embodiment 3, including respectively advantages of Embodiment 2 and Embodiment 3.

Embodiment 5

Embodiment 5 of the invention will be explained in reference to FIG. 11 and FIG. 12 as follows. FIG. 11 is a system diagram showing other example of a feeding system of a single bus type, FIG. 12 is a side view showing an example of a gas-insulated power apparatus in correspondence with the system diagram of FIG. 11 by constituting a portion thereof by a section. Further, in FIG. 11 and FIG. 12, portions the same as or corresponding to those of FIG. 1 through FIG. 10 are attached with the same notations, and in explaining of Embodiment 5 as follows, a point different from FIG. 1 through FIG. 10 will mainly be explained, and an explanation of the other will be spared.

As exemplified in FIGS. 11 and 12, Embodiment 5 is a case when applied to a single bus Y and as shown by FIG. 12, a constitution thereof is a gas-insulated power apparatus including the vertically arranged gas-insulated circuit breaker CB included in the vertically arranged gas-insulated main tank GIMT, the first gas-insulated branch pipe GIBT1 connected to the one side of the upper portion of the gas-insulated main tank GIMT substantially orthogonal to the direction of extending the gas-insulated main tank GIMT, including the current transformer CT1 and leading out the feeder from the movable side of the gas-insulated circuit breaker CB, the second gas-insulated branch pipe GIBT2 disposed on the lower side of the first gas-insulated branch pipe GIBT1 at the lower portion of the gas-insulated main tank GIMT connected substantially orthogonally to the direction of the extending the gas-insulated main tank GIMT and connecting the fixed side of the gas-insulated circuit breaker CB to the gas-insulated bus Y, the linear first connection conductor 3ΦCD1 one end of which is connected to the gas-insulated Y bus and other end of which is extended to the lower portion of inside of the gas-insulated main tank, the linear second connection conductor 3ΦCD2 which is arranged at inside of the gas-insulated main tank GIMT, the upper end of which is connected to the gas-insulated circuit breaker CB and the lower end of which is connected to the first connection conductor 3ΦCD1, respectively, and the bus side current transformer CT2 arranged at inside of the gas-insulated main tank GIMT in correspondence with the second connection conductor 3ΦCD2.

Further, although in Embodiments 1 through 4, there is the gas-insulated bus X, according to Embodiment 5, there is not the gas-insulated bus X, and therefore, the flange FLX is hermetically closed by a hermetically closing lid ATCX.

Embodiment 6

Embodiment 6 of the invention will be explained in reference to FIG. 13 and FIG. 14 as follows. FIG. 13 is a system diagram showing other example of a feeding system of a double bus type, FIG. 14 is a side view showing an example of a gas-insulated power apparatus in correspondence with the system diagram of FIG. 13 by constituting a portion thereof by a section. Further, in FIG. 13 and FIG. 14, portions the same as or corresponding to those of FIG. 1 through FIG. 12 are attached with the same notations, and in explaining of Embodiment 6 as follows, a point different from FIG. 1 through FIG. 12 will mainly be explained, and an explanation of the other will be spared.

According to Embodiment 6, as exemplified in FIG. 14, the gas-insulated main tank GIMT is constituted by a structure divided in two in an up and down direction, an upper gas-insulated main tank GIMTU and a lower gas-insulated main tank GIMTL of the two-divided structure are attachably and detachably coupled by way of a flange FLUL and the vertically arranged gas-insulated circuit breaker CB is arranged at inside of the upper gas-insulated main tank GIMTU.

According to Embodiment 6, the gas-insulated main tank GIMT can be divided in two in the up and down direction, and therefore, an integrating efficiency is promoted, further, in an accident of the gas-insulated circuit breaker CB, only the upper gas-insulated main tank GIMTU can be detached without disassembling the buses X, Y.

Embodiment 7

Embodiment 7 of the invention will be explained in reference to FIG. 15 and FIG. 16 as follows. FIG. 15 is a system diagram showing other example of a feeding system of a double bus type, FIG. 16 is a side view showing an example of a gas-insulated power apparatus in correspondence with the system diagram of FIG. 15 by constituting a portion thereof by a section. Further, in FIG. 15 and FIG. 16, portions the same as or corresponding to those of FIG. 1 through FIG. 14 are attached with the same notations, and in explaining of Embodiment 7 as follows, a point different from FIG. 1 through FIG. 14 will mainly be explained, and an explanation of the other will be spared.

According to Embodiment 7, as exemplified in FIG. 16, the gas-insulated main tank GIMT is constituted by a structure divided in two in an up and down direction, the upper gas-insulated main tank GIMTU and the lower gas-insulated main tank GIMTL of the two-divided structure are attachably and detachably coupled by way of the flange FLUL, and the vertically arranged gas-insulated circuit breaker CB and the bus side current transformer CT2 are arranged at inside of the upper gas-insulated main tank GIMTU.

The bus side current transformer CT2 is arranged on the side of the flange FLUL of the gas-insulated circuit breaker CB, and therefore, the gas-insulated main tank GIMT can be divided in two in the up and down direction similar to Embodiment 6, and therefore, the integrating efficiency is promoted, further, in an accident of the gas-insulated circuit breaker CB, only the upper gas-insulated main tank GIMTU can be detached without disassembling the buses X, Y, further, when a user requests only to integrate the bus side current transformer CT2, the operation of integrating the bus side current transformer CT2 is easy.

Embodiment 8

Embodiment 8 of the invention will be explained in reference to FIG. 17 and FIG. 18 as follows. FIG. 17 is a system diagram showing other example of a feeding system of a double bus type, FIG. 18 is a side view showing an example of a gas-insulated power apparatus in correspondence with the system diagram of FIG. 17 by constituting a portion thereof by a section. Further, in FIG. 17 and FIG. 18, portions the same as or corresponding to those of FIG. 1 through FIG. 16 are attached with the same notations, and in explaining of Embodiment 7 as follows, a point different from FIG. 1 through FIG. 16 will mainly be explained, and an explanation of the other will be spared.

According to Embodiment 8, as exemplified in FIG. 18, the bus side current transformer CT2 is arranged at inside of the lower gas-insulated main tank to be disposed at the lower side of the gas-insulated circuit breaker CB, at inside of the gas-insulated main tank, the insulating gas is partitioned by the side of the gas-insulated circuit breaker and the side of the bus side current transformer CT2 between the gas-insulated circuit breaker CB and the bus side current transformer CT2 by an insulating gas partitioning plate GSSP made of an insulating substance.

The insulating gas partitioning plate GSSP is attached to the flange FLUL. Further, the 3 phase second connection conductor 3ΦCD2 penetrates the insulating gas portioning plate GSSP in airtight.

According to Embodiment 8, owing to the above-described constitution, for example, operation of checking the gas-insulated circuit breaker CB can be carried out by extracting only the insulating gas on the side of the gas-insulated circuit breaker CB without extracting the insulating gas on the side of the bus side current transformer CT2.

Embodiment 9

Embodiment 9 of the invention will be explained in reference to FIG. 19 and FIG. 20 as follows. FIG. 19 is a system diagram showing other example of a feeding system of a double bus type, FIG. 20 is a side view showing an example of a gas-insulated power apparatus in correspondence with the system diagram of FIG. 19 by constituting a portion thereof by a section. Further, in FIG. 19 and FIG. 20, portions the same as or corresponding to those of FIG. 1 through FIG. 18 are attached with the same notations, and in explaining of Embodiment 7 as follows, a point different from FIG. 1 through FIG. 18 will mainly be explained, and an explanation of the other will be spared.

As exemplified in FIG. 20, Embodiment 9 is a gas-insulated power apparatus including the vertically arranged gas-insulated circuit breaker CB included in the vertically arranged gas-insulated main tank GIMT, the first gas-insulated branch pipe GIBT1 connected to one side of the upper portion of the gas-insulated main tank GIMT by way of the first flange FLF substantially orthogonal to the direction of extending the gas-insulated main tank GIMT, including the current transformer CT1 and leading out the feeder from the movable side of the gas-insulated circuit breaker CB, the second gas-insulated branch pipe GIBT2 connected to the one side in the peripheral direction of the lower portion of the gas-insulated main tank GIMT by way of the second flange FLY substantially orthogonal to the direction of extending the gas-insulated main tank GIMT and connecting the fixed side of the gas-insulated circuit breaker CB to the gas-insulated Y bus of one of the gas-insulated double buses, the third gas-insulated branch pipe GIBT3 connected to the other side in the peripheral direction of the lower portion of the gas-insulated main tank GIMT by way of the third flange FLX substantially orthogonal to the direction of extending the gas-insulated main tank GIMT and connecting the fixed side of the gas-insulated circuit breaker CB to the other gas-insulated X bus of other of the gas-insulated double buses, a fourth flange FLSP provided on one side in the peripheral direction of a middle portion of the gas-insulated main tank GIMT to be disposed between the first flange FLF and the second flange FLY, and a fifth flange FLSPA provided on other side in the peripheral direction of the middle portion of the gas-insulated main tank to be disposed on a side of the peripheral direction opposed to the fourth flange FLSP, wherein respective diameters of the second through the fifth flanges FLY, FLX, FLSP, FLSPA are the same.

According to Embodiment 8, owing to the above-described constitution, the second and the third respective gas-insulated branch pipes GIBT2, GIBT3 can easily be attached and detached to and from any of the second through the fifth flanges FLY, FLX, FLSP, FLSPA, and therefore, customer use of arranging the bus lines can flexibly be dealt with and the arrangement of the bus lines can be changed in accordance with an installing environment in being installed at a cite.

DESCRIPTION OF REFERENCE NUMERALS AND SIGNS

Figure 1:
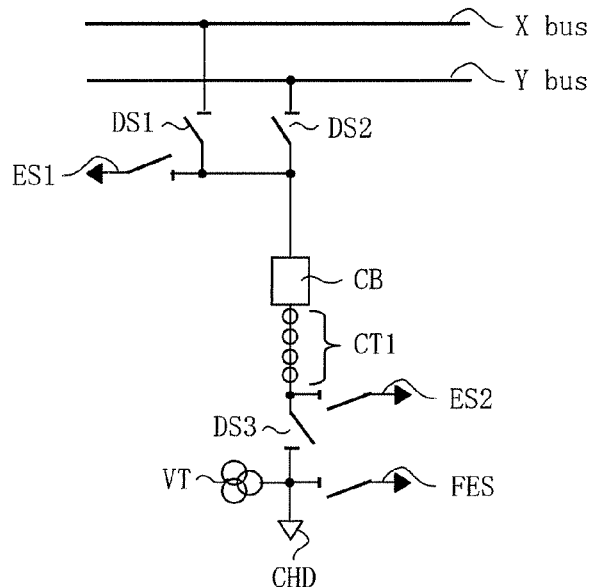
FIG. 1 is a diagram showing Embodiment 1 of the invention and a system diagram showing an example of a feeding system of a double bus type.
Figure 2:
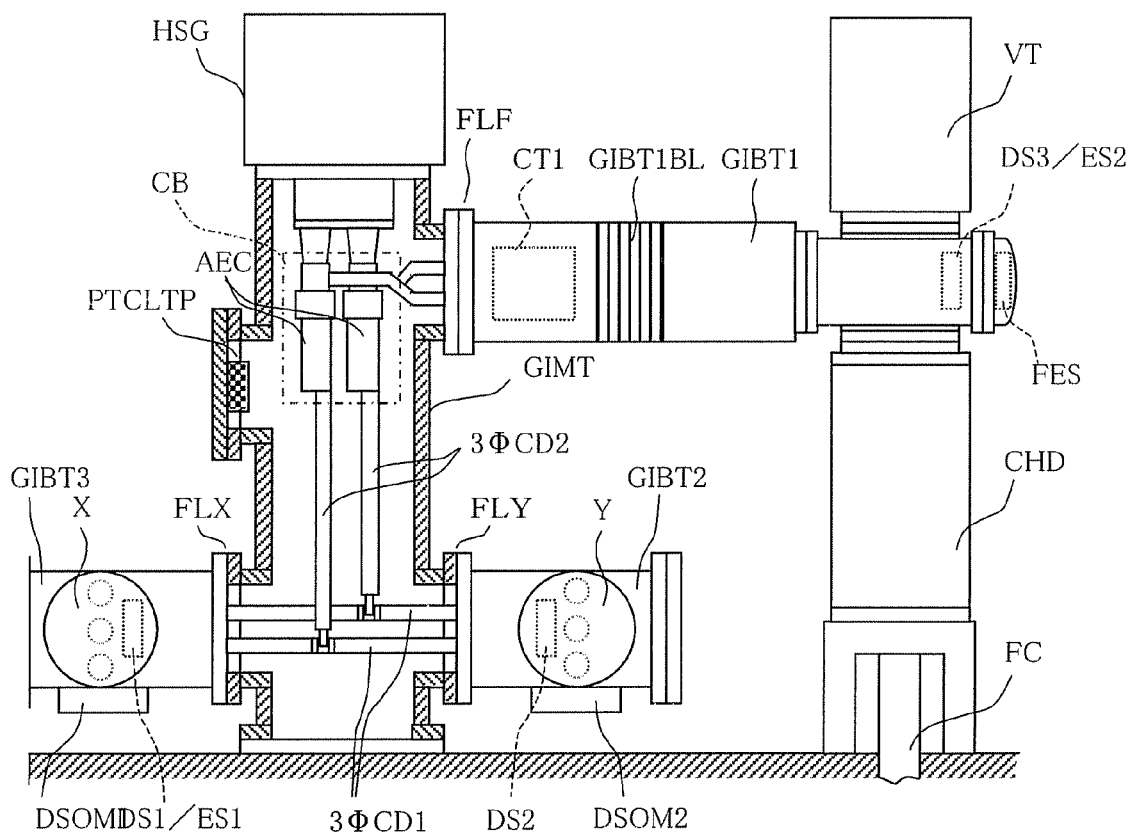
FIG. 2 is a view showing Embodiment 1 of the invention and a side view showing an example of a gas-insulated power apparatus in correspondence with the system diagram of FIG. 1 by constituting a portion thereof by a section.
Figure 3:
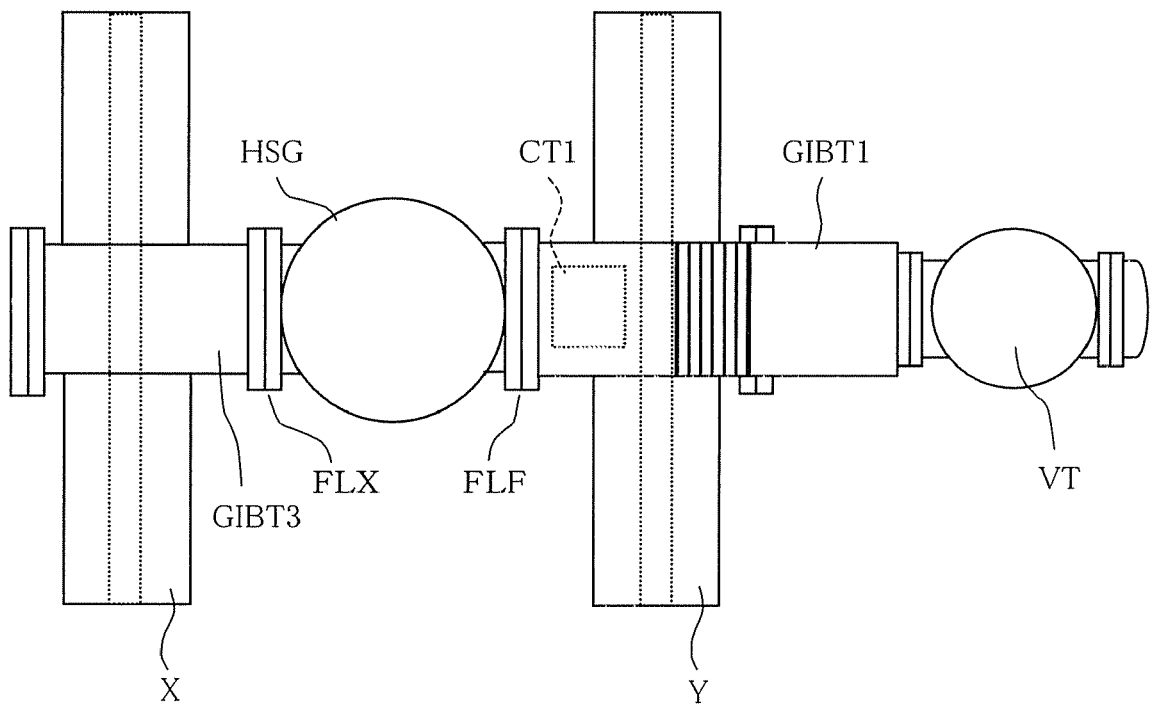
FIG. 3 is a view showing Embodiment 1 of the invention and a plane view of the gas-insulate power apparatus shown in FIG. 2.
Figure 4:
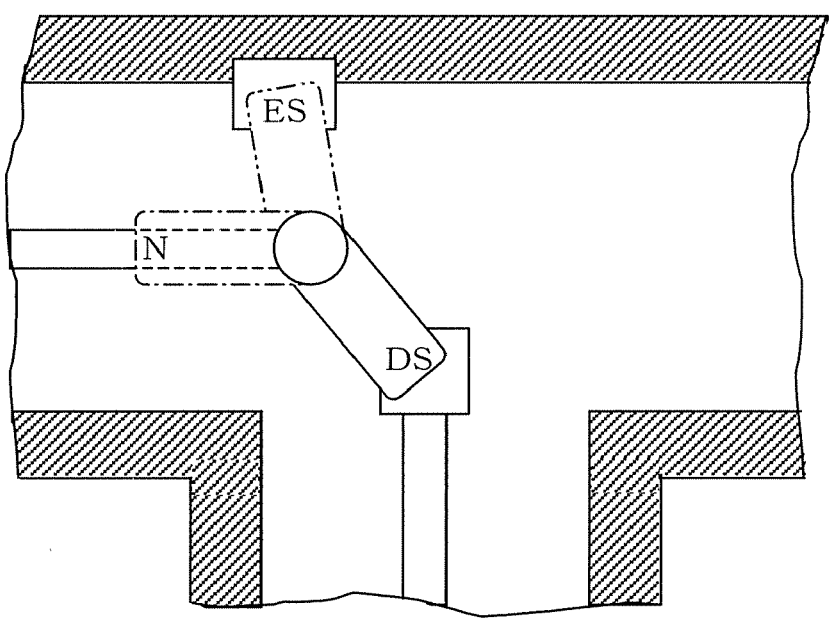
FIG. 4 is a view showing Embodiment 1 of the invention and a plane view showing a case of a rotary type switch DS/ES having a function of a disconnecting switch and a function of a grounding switch.
Figure 5:
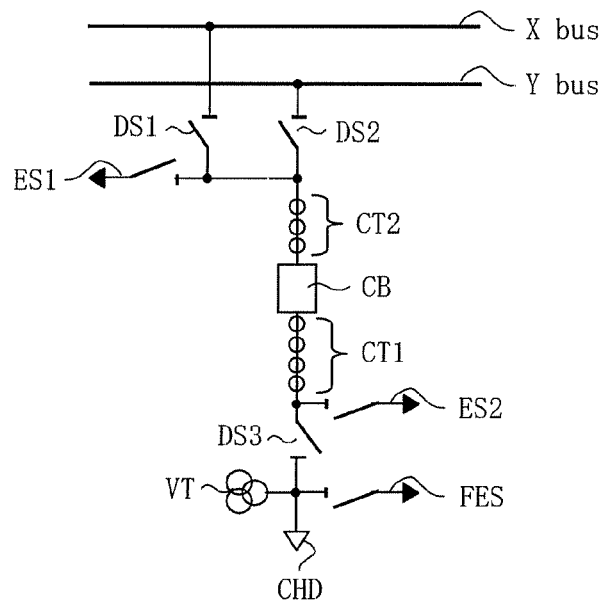
FIG. 5 is a diagram showing Embodiment 2 of the invention and a system diagram showing other example of a feeding system of a double bus type.
Figure 6:
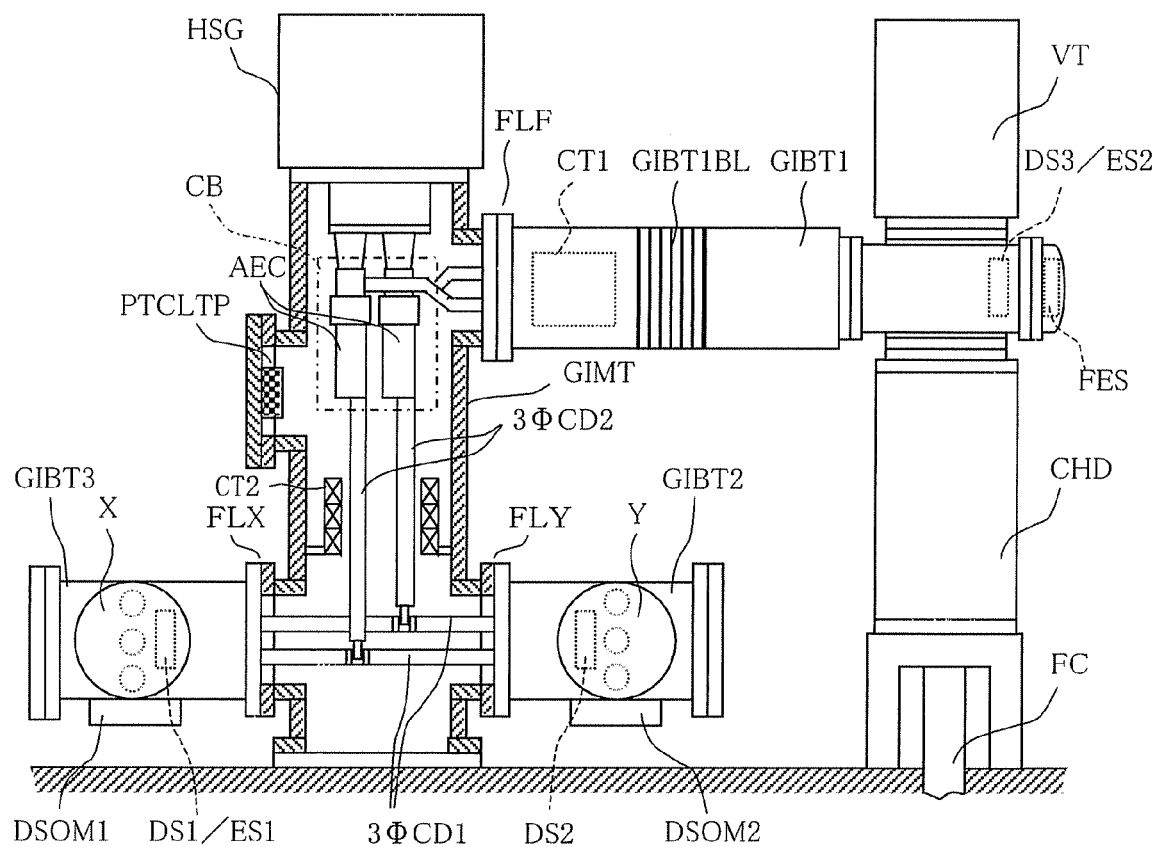
FIG. 6 is a view showing Embodiment 2 of the invention and a side view showing an example of a gas-insulated power apparatus in correspondence with the system diagram of FIG. 5 by constituting a portion thereof by a section.
Figure 7:
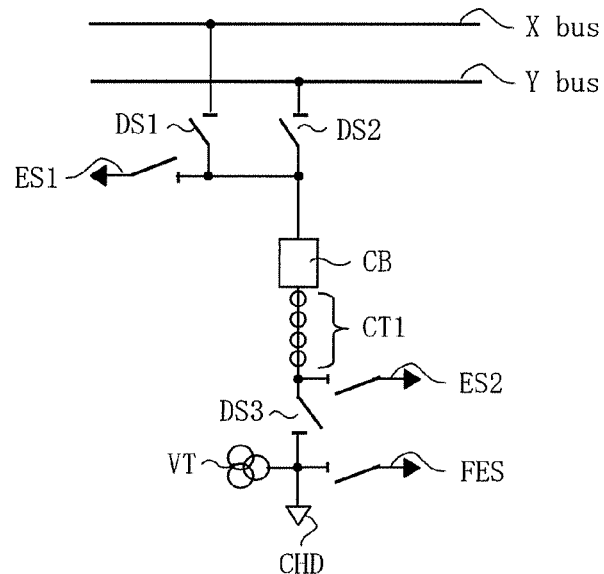
FIG. 7 is a diagram showing Embodiment 3 of the invention and a system diagram showing other example of a feeding system of a double bus type.
Figure 8:
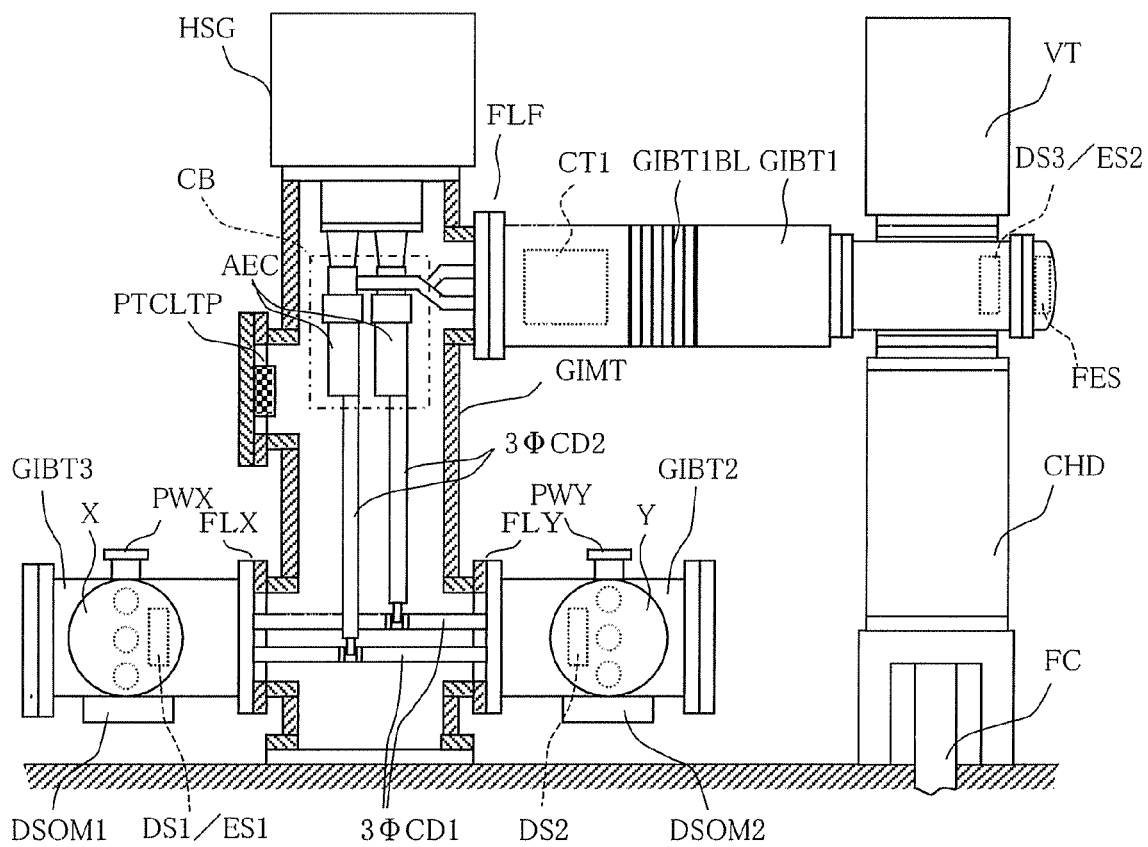
FIG. 8 is a view showing Embodiment 3 of the invention and a side view showing an example of a gas-insulated power apparatus in correspondence with the system diagram of FIG. 7 by constituting a portion thereof by a section.
Figure 9:
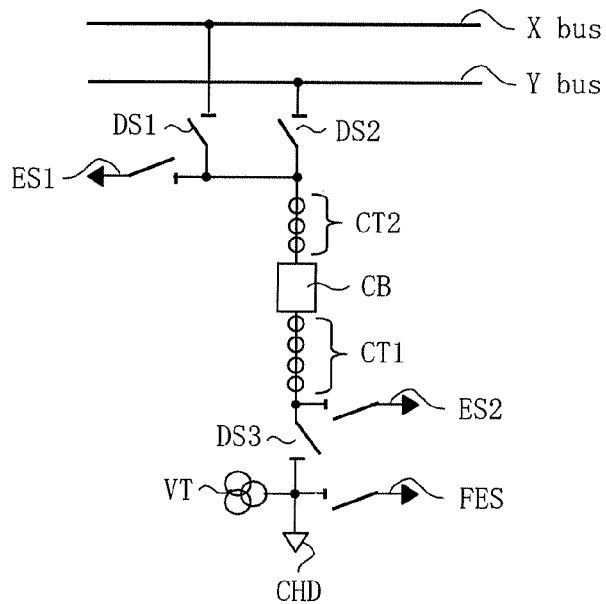
FIG. 9 is a diagram showing Embodiment 4 of the invention and a system diagram showing other example of a feeding system of a double bus type.
Figure 10:
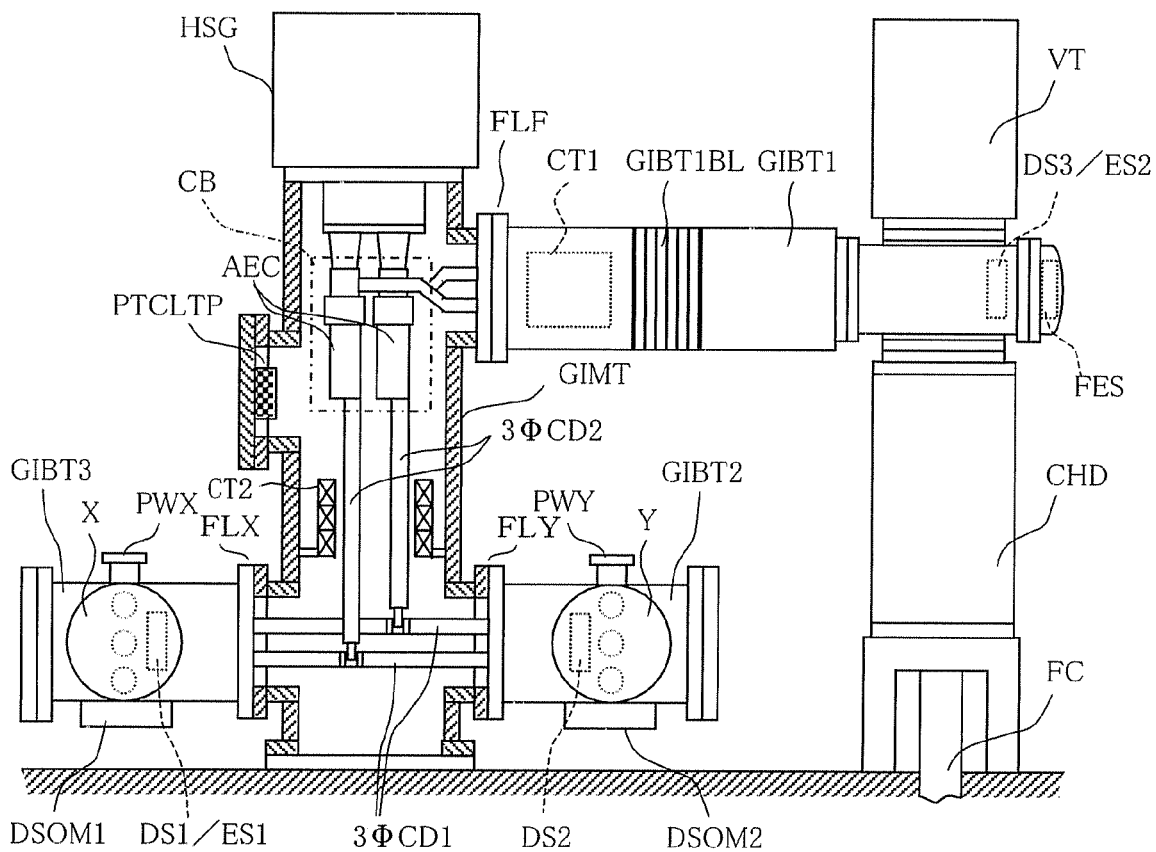
FIG. 10 is a view showing Embodiment 4 of the invention and a side view showing an example of a gas-insulated power apparatus in correspondence with the system diagram of FIG. 9 by constituting a portion thereof by a section.
Figure 11:
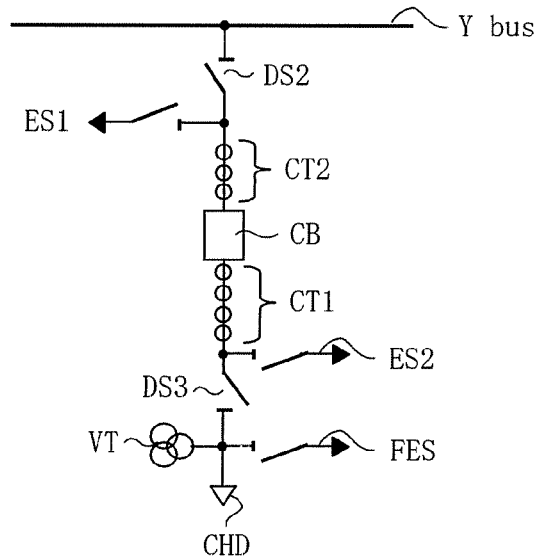
FIG. 11 is a diagram showing Embodiment 5 of the invention and a system diagram showing an example of a feeding system of a single bus type.
Figure 12:
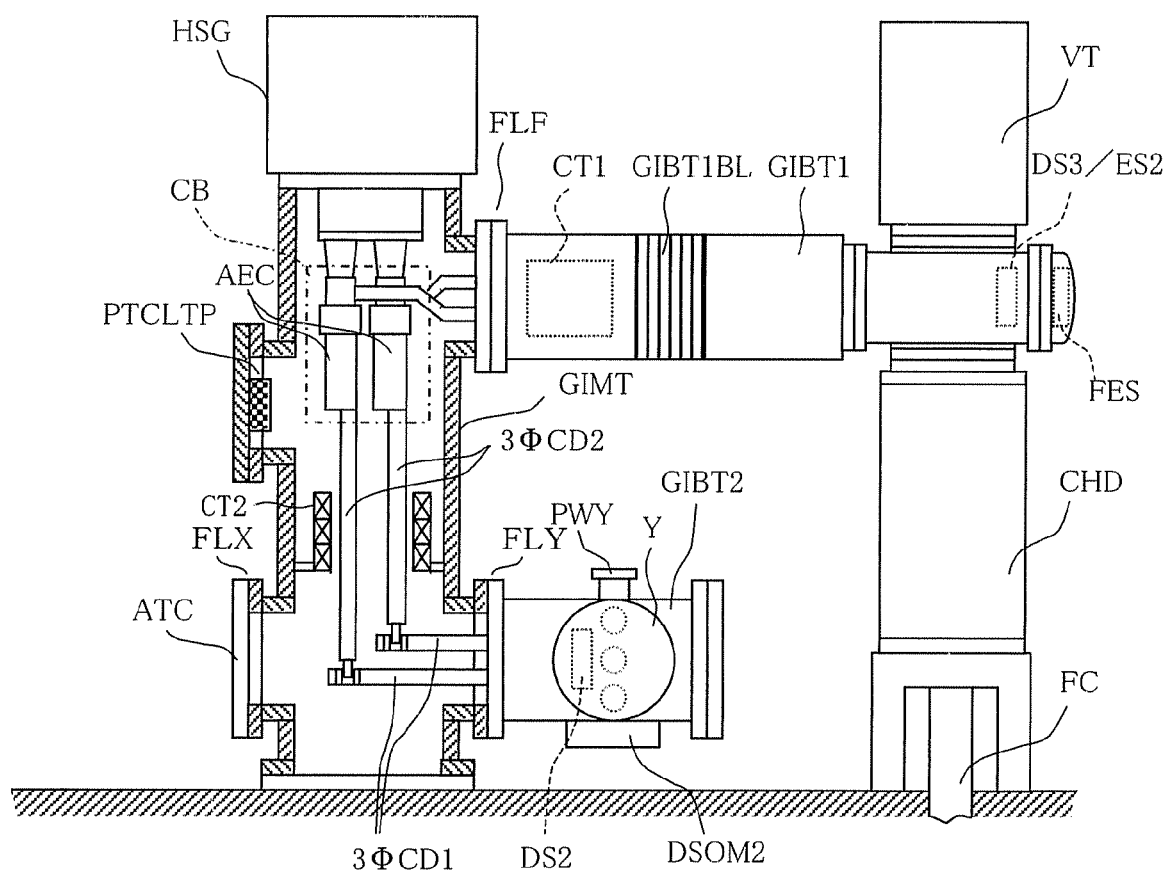
FIG. 12 is a view showing Embodiment 5 of the invention and a side view showing an example of a gas-insulated power apparatus in correspondence with the system diagram of FIG. 11 by constituting a portion thereof by a section.
Figure 13:
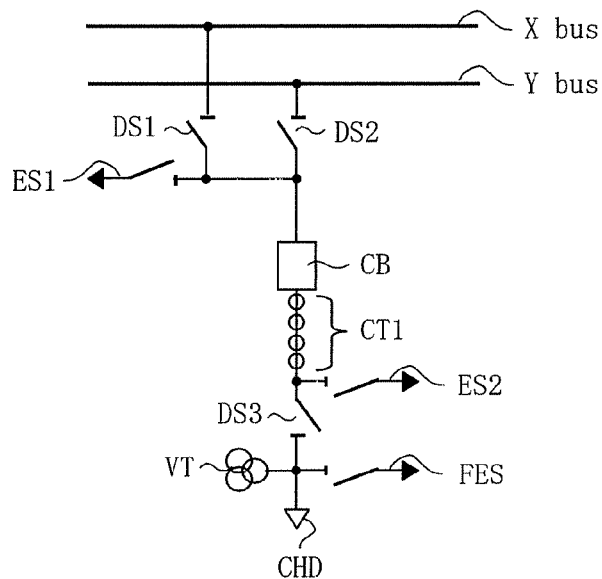
FIG. 13 is a diagram showing Embodiment 6 of the invention and a system diagram showing other example of a feeding system of a double bus type.
Figure 14:
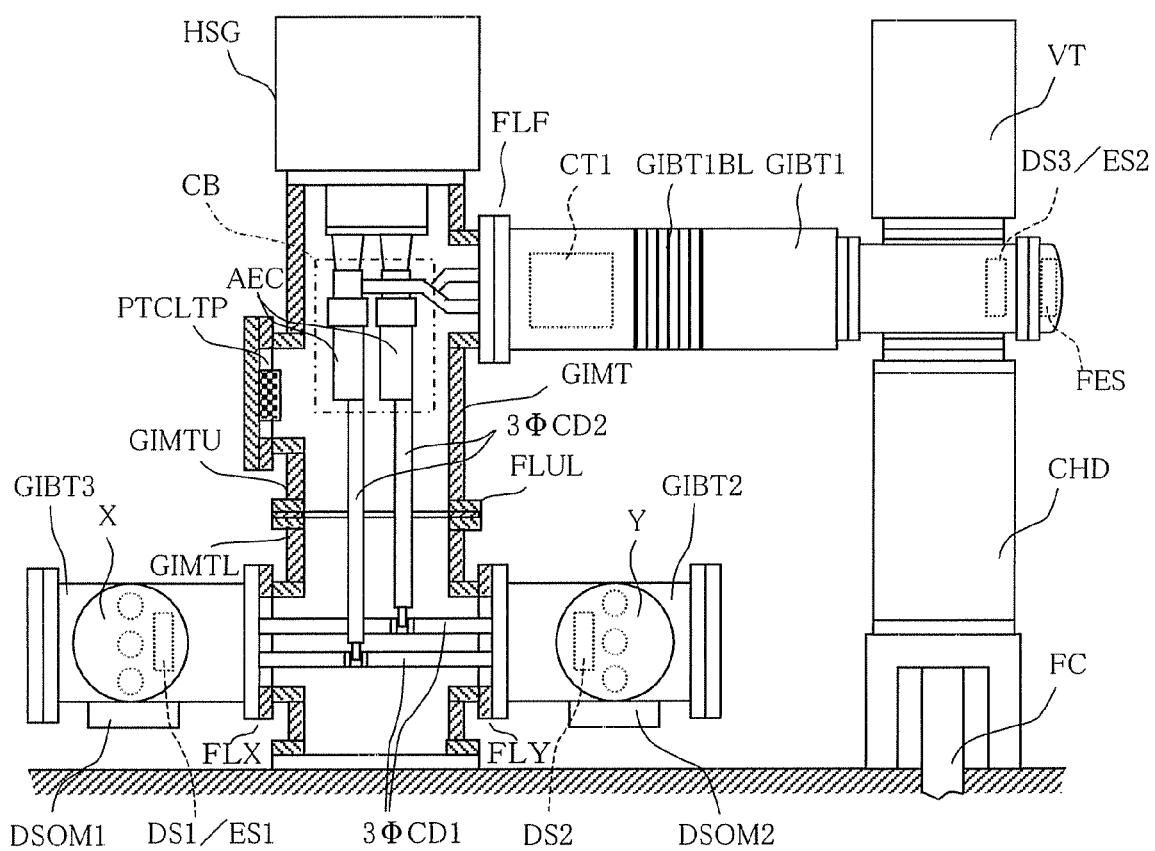
FIG. 14 is a view showing Embodiment 6 of the invention and a side view showing an example of a gas-insulated power apparatus in correspondence with the system diagram of FIG. 13 by constituting a portion thereof by a section.
Figure 15:
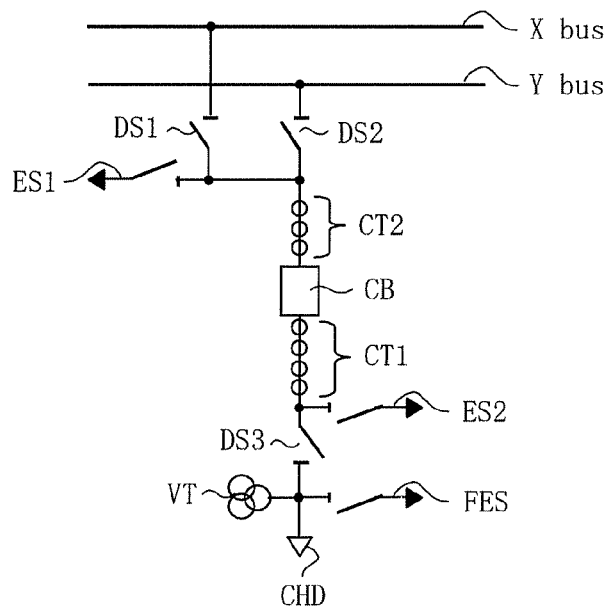
FIG. 15 is a diagram showing Embodiment 7 of the invention and a system diagram showing other example of a feeding system of a double bus type.
Figure 16:
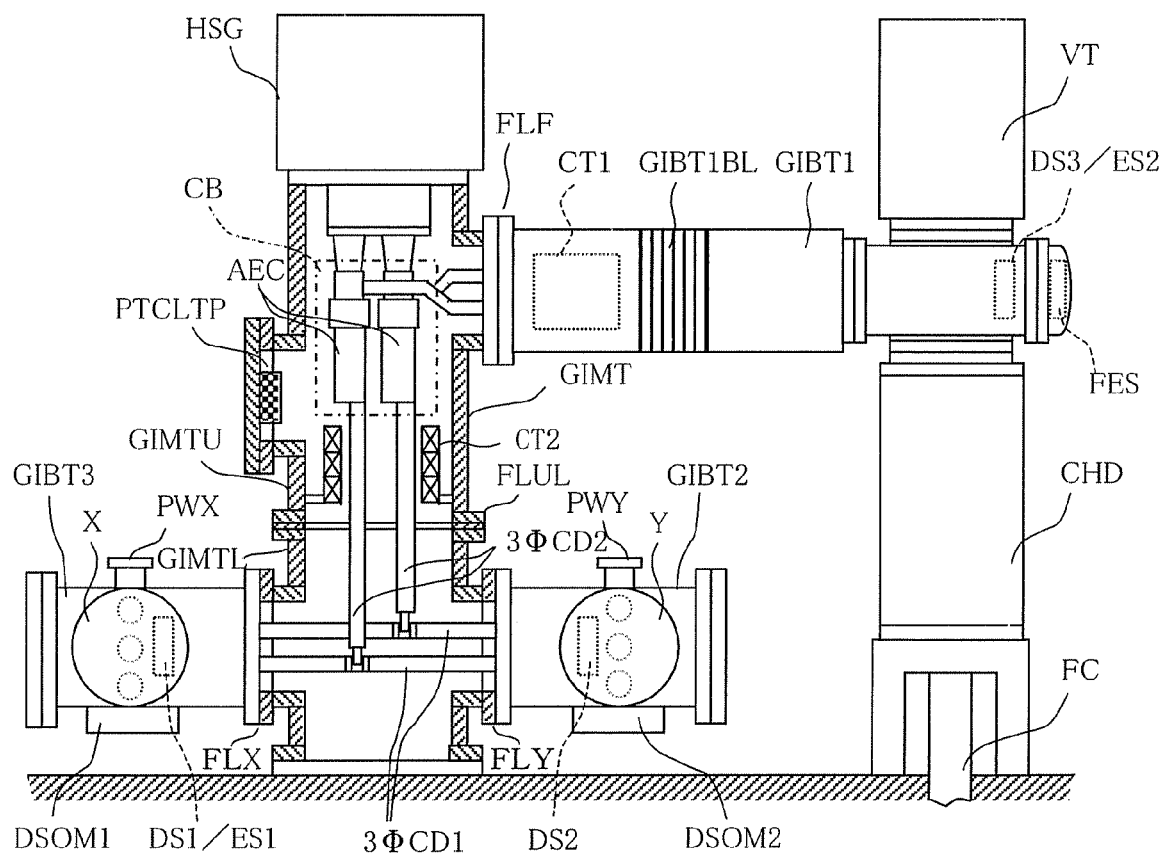
FIG. 16 is a view showing Embodiment 7 of the invention and a side view showing an example of a gas-insulated power apparatus in correspondence with the system diagram of FIG. 15 by constituting a portion thereof by a section.
Figure 17:
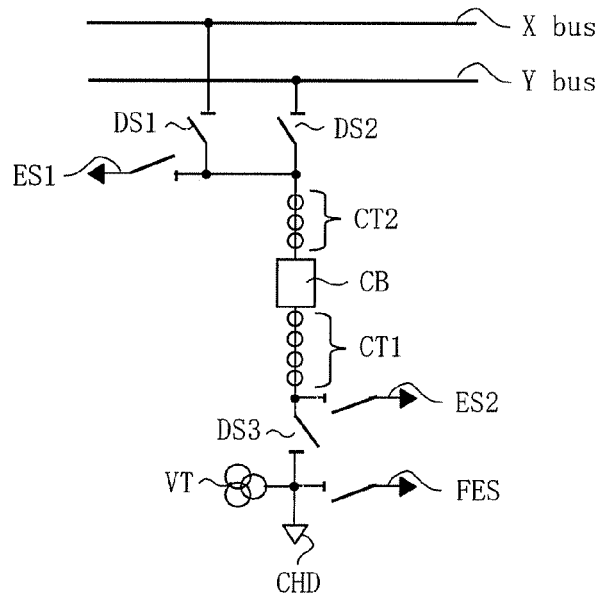
FIG. 17 is a diagram showing Embodiment 8 of the invention and a system diagram showing other example of a feeding system of a double bus type.
Figure 18:
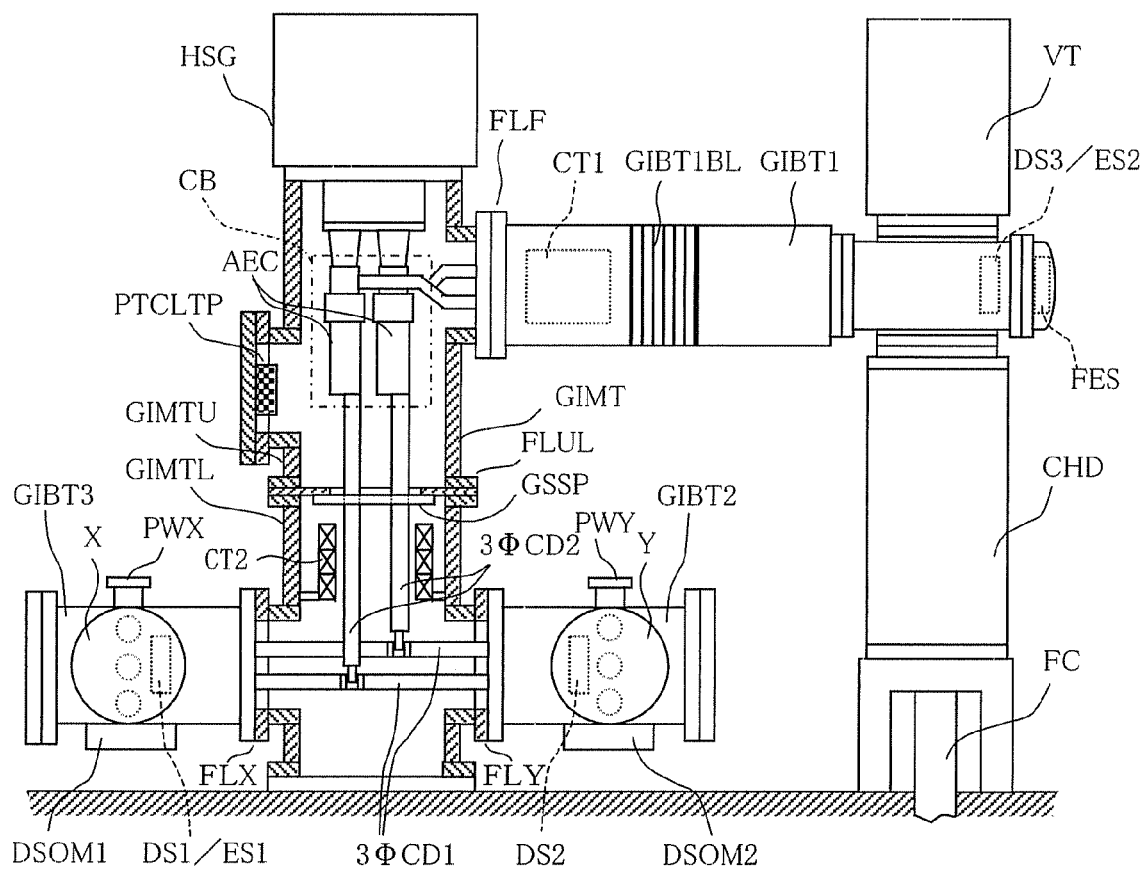
FIG. 18 is a view showing Embodiment 8 of the invention and a side view showing an example of a gas-insulated power apparatus in correspondence with the system diagram of FIG. 17 by constituting a portion thereof by a section.
Figure 19:
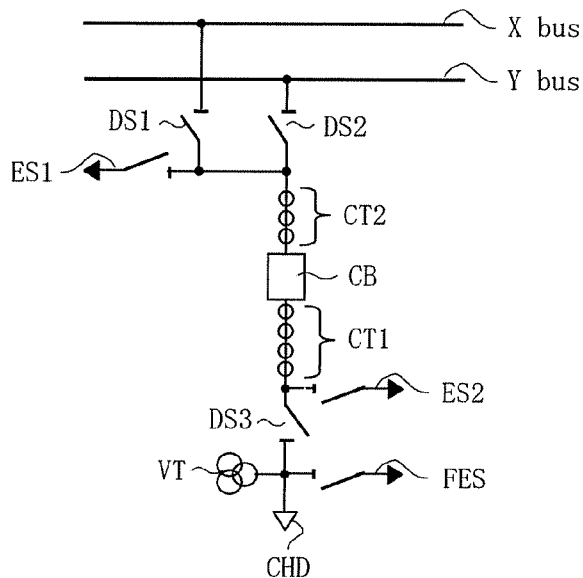
FIG. 19 is a diagram showing Embodiment 9 of the invention and a system diagram showing other example of a feeding system of a double bus type.
Figure 20:
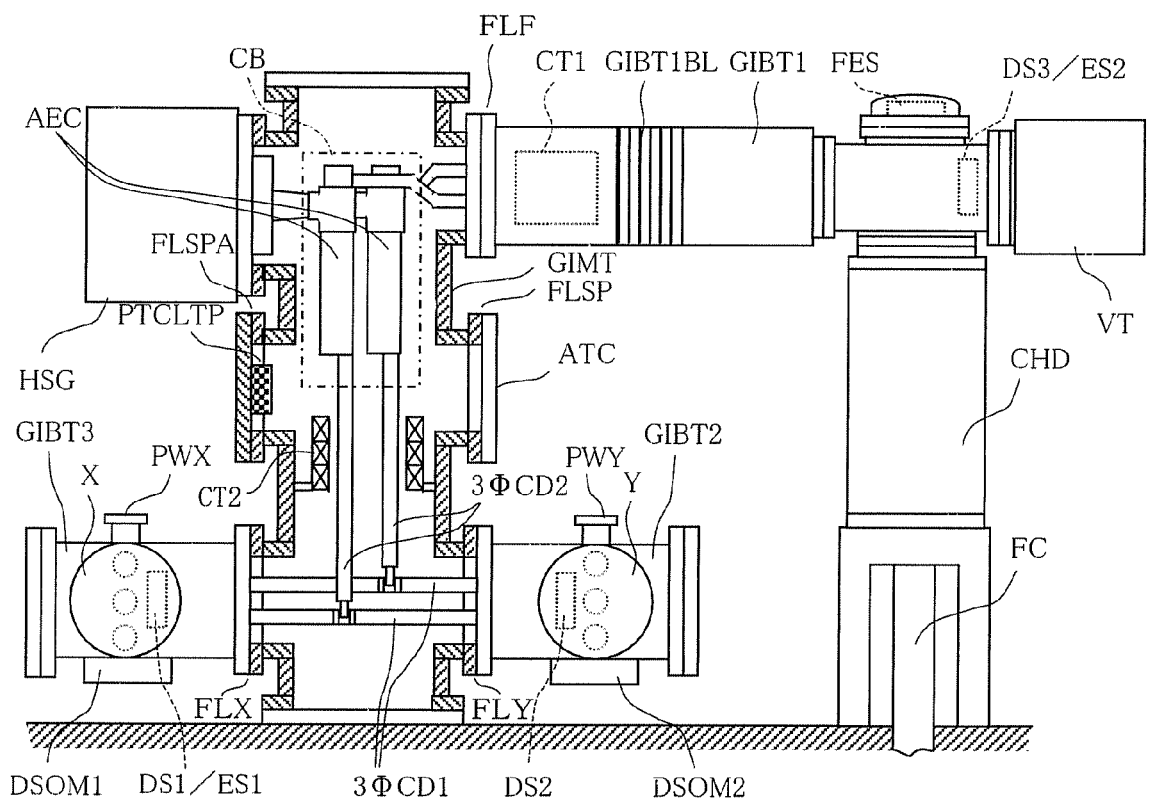
FIG. 20 is a view showing Embodiment 9 of the invention and a side view showing an example of a gas-insulated power apparatus in correspondence with the system diagram of FIG. 19 by constituting a portion thereof by a section.
Figure 21:
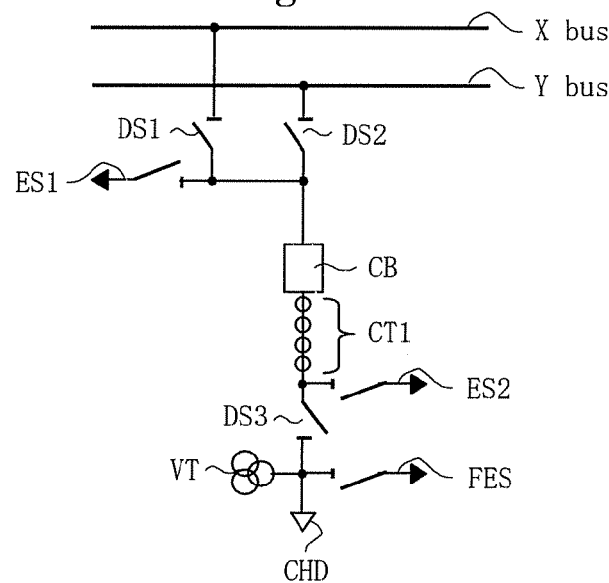
FIG. 21 is a diagram showing one example of a background art apparatus and a system diagram showing other example of a feeding system of a double bus type.
Figure 22:
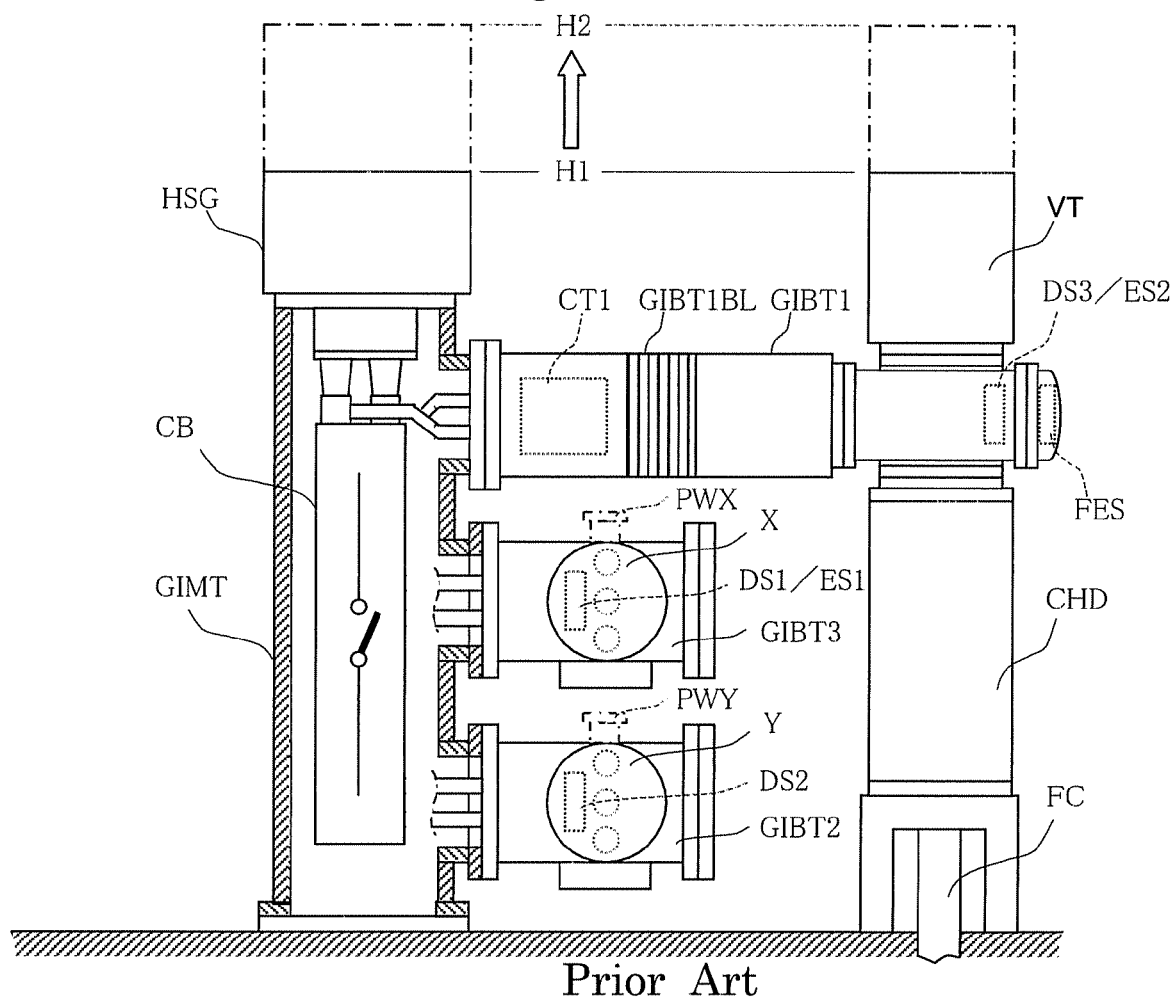
FIG. 22 is a view showing one example of the background art and a side view showing an example of a gas-insulated power apparatus in correspondence with the system diagram of FIG. 21 by constituting a portion thereof by a section.
Figure 23:
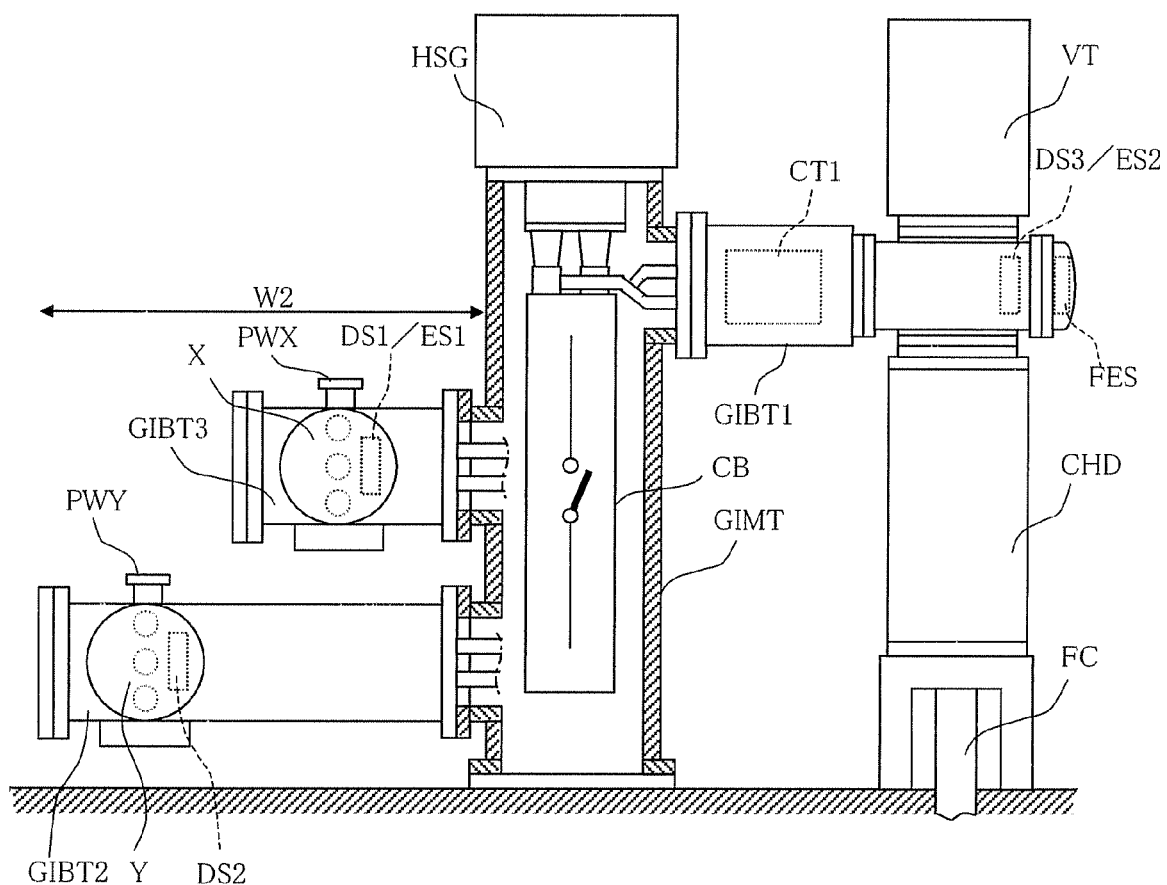
FIG. 23 is a view showing other example of a background apparatus and a side view showing other example of a gas-insulated power apparatus by constituting a portion thereof by a section.
Figure 24:
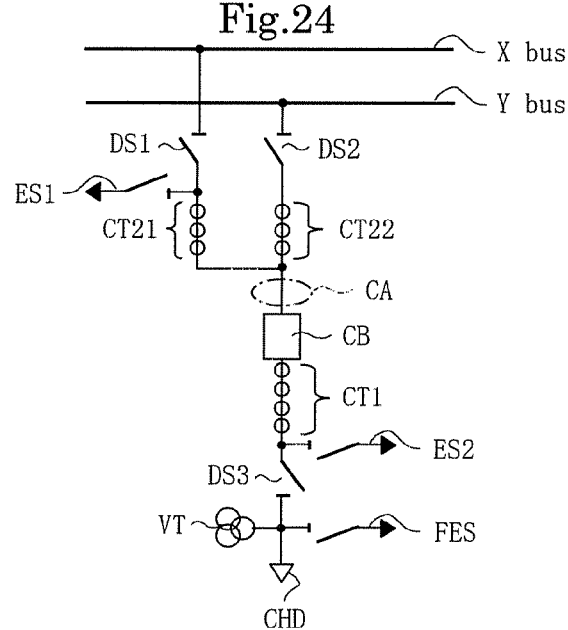
FIG. 24 is a diagram showing still other example of a background art apparatus and a system diagram showing other example of a feeding system of a double bus type.
Figure 25:
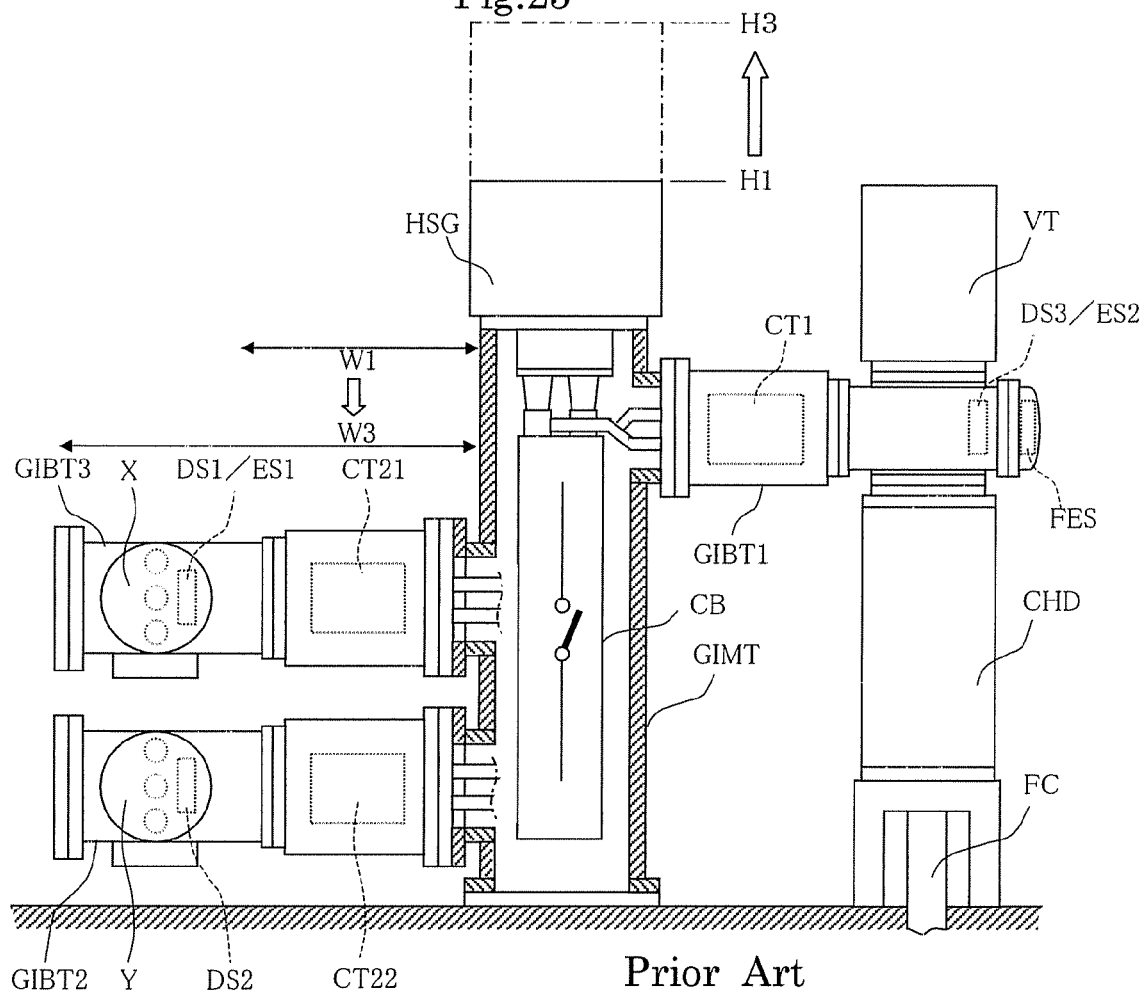
FIG. 25 is a view showing still other example of the background art apparatus and a side view showing an example of a gas-insulated power apparatus in correspondence with the system diagram of FIG. 24 by constituting a portion thereof by a section.

AEC arc extinguishing chamber of gas-insulated circuit breaker CB
CB gas-insulated circuit breaker
CHD cable head
CT1 current transformer
CT2, CT21, CT22 bus side current transformers
DS disconnecting switch close position DS1, DS2 bus side disconnecting switches
DS3 disconnecting switch
DSOM1, DSOM2 operating apparatus of disconnecting switches
DS1/ES1 bus side disconnecting switch/installed switch
ES ground position
ES1, ES2 grounding switches
FC feeder cable
FES line side grounding switch
FLF flange (first flange)
FLSP fourth flange
FLSPA fifth flange
FLX flange (third flange)
FLY flange (second flange)
FLUL flange
GIBT1 first gas-insulated branch pipe
GIBT1BL bellows
GIBT2 second gas-insulated branch pipe
GIBT3 third gas-insulated branch pipe
GIMT gas-insulated main tank
GIMTL lower gas-insulated main tank
GIMTU upper gas-insulated main tank
GSSP insulating gas partitioning plate
N disconnecting switch open position
PTCLTP particle trap
PWX, PWY view port
VT voltage transformer
X, Y double buses
3ΦCD1 linear first connection conductor
3ΦCD2 linear second connection conductor

The invention claimed is:

1. A gas-insulated power apparatus comprising a vertically arranged gas-insulated circuit breaker included in a vertically arranged gas-insulated main tank, a first gas-insulated branch pipe connected to one side of an upper portion of the gas-insulated main tank substantially orthogonal to a direction of extending of the gas-insulated main tank and leading out a feeder from a movable side of the gas-insulated circuit breaker, a second and a third gas-insulated branch pipes which are respectively connected to both sides in a peripheral direction of a lower portion of the gas-insulated main tank substantially orthogonal to the direction of extending of the gas-insulated main tank, one of which connects a fixed side of the gas-insulated circuit breaker to one gas-insulated Y bus of gas-insulated double buses and the other of which connects the fixed side of the gas-insulated circuit breaker to the other gas-insulated X bus of the gas-insulated double buses, respectively, a first connection conductor in a linear shape arranged inside of the gas-insulated main tank for connecting the gas-insulated Y bus of the one of the gas-insulated double buses and the gas-insulated X bus of the other of the gas-insulated double buses, and a second connection conductor in a linear shape which is arranged inside of the gas-insulated main tank, an upper end of which is connected to the gas-insulated circuit breaker and a lower end of which is connected to the first connection conductor, respectively.

2. The gas-insulated power apparatus according to claim 1, wherein the gas-insulated Y bus of the one of the gas-insulated double buses intersects with the second gas-insulated branch pipe, and the gas-insulated X bus of the other of the gas-insulated double buses intersects with the third gas-insulated branch pipe.

3. The gas-insulated power apparatus according to claim 2, wherein either of the gas-insulated Y bus of the one of the gas-insulated double buses and the gas-insulated X bus of the other of the gas-insulated double buses is a 3 phases summarized gas-insulated bus.

4. The gas-insulated power apparatus according to claim 2, wherein view ports are respectively provided on an upper side of a portion of the gas-insulated Y bus intersecting the second gas-insulated branch pipe and on an upper side of a portion of the gas-insulated X bus intersecting the third gas-insulated branch pipe.

5. The gas-insulated power apparatus according to claim 4, wherein bus side disconnecting switches are included at the portion of the gas-insulated Y bus intersecting the second gas-insulated branch pipe and the portion of the gas-insulated X bus intersecting the third gas-insulated branch pipe, and operating apparatus of the disconnecting switches are provided on a lower side of the portion of the gas-insulated Y bus intersecting the second gas-insulated branch pipe and on a lower side of the portion of the gas-insulated X bus intersecting the third gas-insulated branch pipe.

6. The gas-insulated power apparatus according to claim 1, wherein a bus side current transformer is arranged inside of the gas-insulated main tank in correspondence with the second connection conductor.

7. The gas-insulated power apparatus according to claim 1, wherein a bus side current transformer is arranged inside of the gas-insulated main tank in correspondence with the second connection conductor, and view ports are provided on an upper side of a portion of the gas-insulated Y bus intersecting the second gas-insulated branch pipe and on an upper side of a portion of the gas-insulated X bus intersecting the third gas-insulated branch pipe.

8. The gas-insulated power apparatus according to claim 1 wherein the gas-insulated circuit breaker and a side of the feeder of the gas-insulated circuit breaker are constituted by 3 phase summarized gas-insulated apparatus.

9. The gas-insulated power apparatus according to claim 1, wherein the gas-insulated circuit breaker and a side of the feeder of the gas-insulated circuit breaker are constituted by phase separated gas-insulated apparatus separated for respective phases.

10. The gas-insulated power apparatus according to claim 1, wherein the first gas-insulated branch pipe for leading out the feeder from the movable side of the gas-insulated circuit breaker includes a bellows in series therewith.

11. The gas-insulated power apparatus according to claim 1, wherein the gas-insulated main tank is constituted by a structure divided in two in an up and down direction, an upper gas-insulated main tank and a lower gas-insulated main tank which are attachably and detachably coupled by way of a flange, and the vertically arranged gas-insulated circuit breaker is arranged inside of the upper gas-insulated main tank.

12. The gas-insulated power apparatus according to claim 11, wherein a bus side current transformer is arranged inside of the gas-insulated main tank to be disposed on a lower side of the vertically arranged gas-insulated circuit breaker.

13. The gas-insulated power apparatus according to claim 11, wherein a bus side current transformer is arranged inside of the lower gas-insulated main tank to be disposed on a lower side of the gas-insulated circuit breaker, and inside of the gas-insulated main tank an insulating gas is partitioned to a side of the gas-insulated circuit breaker and a side of the bus side current transformer between the gas-insulated circuit breaker and the bus side current transformer.

14. The gas-insulated power apparatus according to claim 1, wherein a circuit breaker operating apparatus of the gas-insulated circuit breaker is attached to the upper portion of the gas-insulated main tank to be disposed on an outer side of the gas-insulated main tank, and an arc extinguishing chamber of the vertically arranged gas-insulated circuit breaker is disposed on a side of the lower portion of the gas-insulated circuit breaker.

15. The gas-insulated power apparatus according to claim 1, wherein a circuit breaker operating apparatus of the gas-insulated circuit breaker is attached to a side portion of the gas-insulated main tank on a side opposed to the first gas-insulated branch pipe, and an arc extinguishing chamber of the vertically arranged gas-insulated circuit breaker is disposed on a side of the lower portion of the gas-insulated circuit breaker.

16. A gas-insulated power apparatus comprising a vertically arranged gas-insulated circuit breaker included in a vertically arranged gas-insulated main tank, a first gas-insulated branch pipe connected to one side of an upper portion of the gas-insulated main tank by way of a first flange substantially orthogonal to a direction of extending of the gas-insulated main tank and leading out a feeder from a movable side of the gas-insulated circuit breaker, a second gas-insulated branch pipe connected to one side in a peripheral direction of a lower portion of the gas-insulated main tank by way of a second flange substantially orthogonal to the direction of extending of the gas-insulated main tank and connecting a fixed side of the gas-insulated circuit breaker to one gas-insulated Y bus of gas-insulated double buses, a third gas-insulated branch pipe connected to the other side in the peripheral direction of the lower portion of the gas-insulated main tank by way of a third flange substantially orthogonal to the direction of extending of the gas-insulated main tank and connecting the fixed side of the gas-insulated circuit breaker to the other gas-insulated X bus of the gas-insulated double buses, a fourth flange disposed between the first flange and the second flange and provided to one side in a peripheral direction of a middle portion of the gas-insulated main tank, a fifth flange provided to the other side in the peripheral direction of the middle portion of the gas-insulated main tank and disposed on an opposed side in the peripheral direction of the fourth flange, wherein diameters of the second through the fourth flanges are the same, a first connection conductor in a linear shape one end of which is connected to the gas-insulated Y bus and the other end of which is extended to a lower portion inside of the gas-insulated main tank, a second connection conductor which is arranged inside of the gas-insulated main tank, an upper end of which is connected to the gas-insulated circuit breaker and a lower end of which is connected to the first connection conductor, respectively.

17. A gas-insulated power apparatus comprising a vertically arranged gas-insulated circuit breaker included in a vertically arranged gas-insulated main tank, a first gas-insulated branch pipe connected to one side of an upper portion of the gas-insulated main tank substantially orthogonal to a direction of extending of the gas-insulated main tank and leading out a feeder from a movable side of the gas-insulated circuit breaker, a second gas-insulated branch pipe connected to a lower portion of the gas-insulated main tank to be disposed on a lower side of the first gas-insulated branch pipe substantially orthogonal to the direction of extending of the gas-insulated main tank and connecting a fixed side of the gas-insulated circuit breaker to gas-insulated double buses, a first connection conductor in a linear shape one end of which is connected to the gas-insulated Y bus and the other end of which is extended to a lower portion inside of the gas-insulated main tank, a second connection conductor which is arranged inside of the gas-insulated main tank, an upper end of which is connected to the gas-insulated circuit breaker and a lower end of which is connected to the first connection conductor, respectively, and a bus side current transformer arranged inside of the gas-insulated main tank in correspondence with the second connection conductor.

18. The gas-insulated power apparatus according to claim 17, wherein the lower end of the second connection conductor is connected to the first connection conductor at an angle of about 90 degrees.

* * * * *